Figure 1:
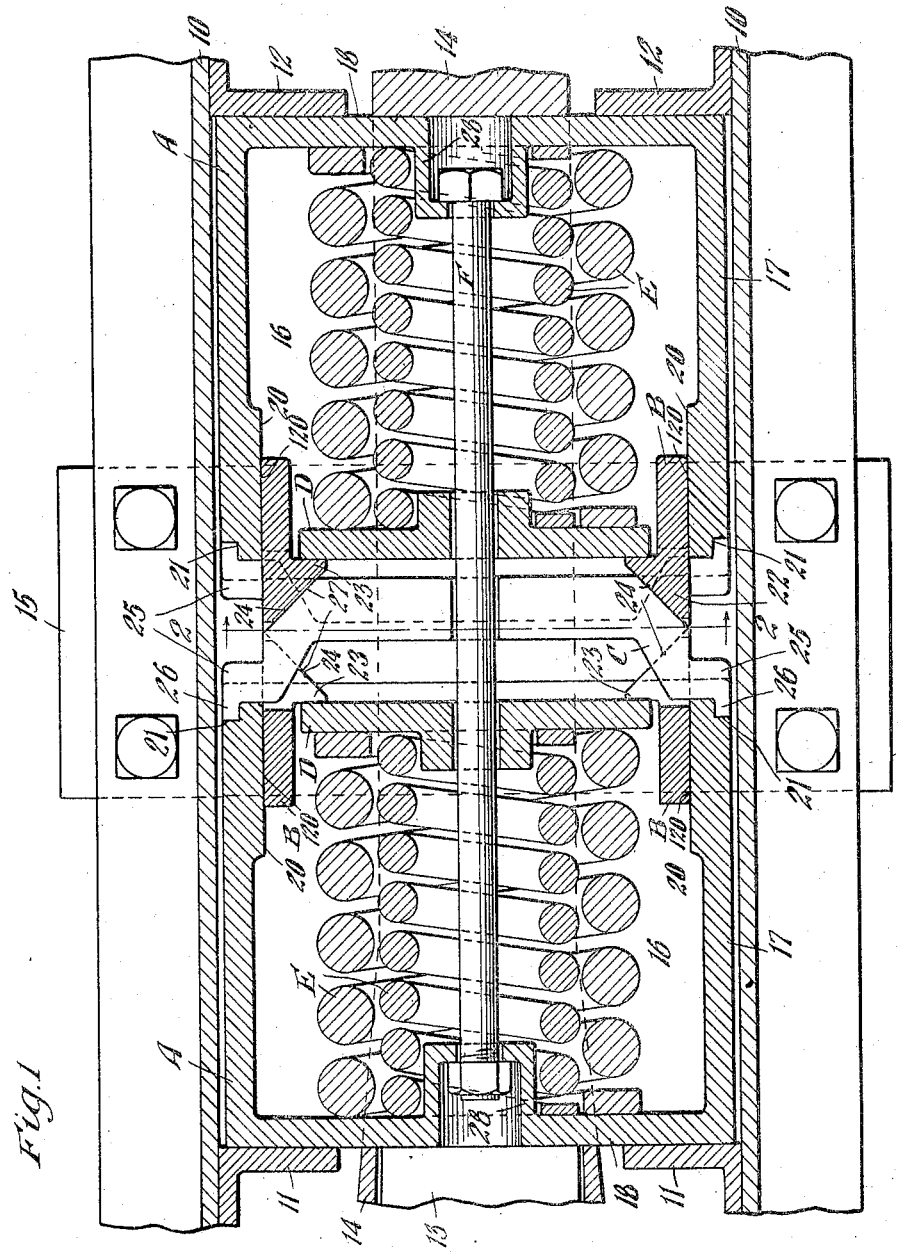

Jan. 4, 1927. 1,613,591
J. F. O'CONNOR
FRICTION SHOCK ABSORBING MECHANISM
Original Filed Dec. 17, 1923  2 Sheets-Sheet 1

Witnesses
Wm. Geiger

Inventor
John F. O'Connor
By George I. Haight
His Atty.

Jan. 4, 1927.　　　　J. F. O'CONNOR　　　　1,613,591
FRICTION SHOCK ABSORBING MECHANISM
Original Filed Dec. 17, 1923　　2 Sheets-Sheet 2
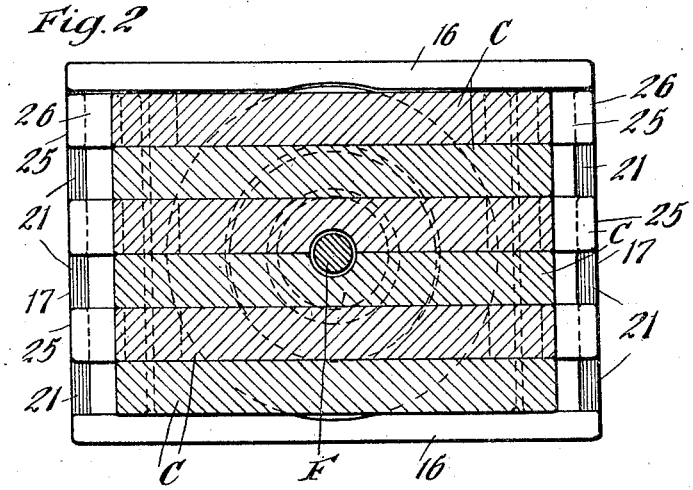
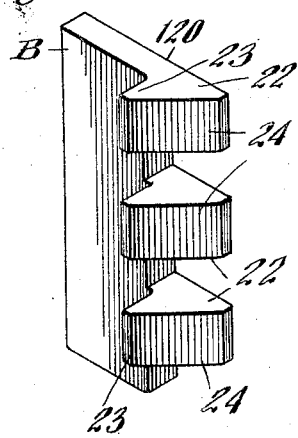
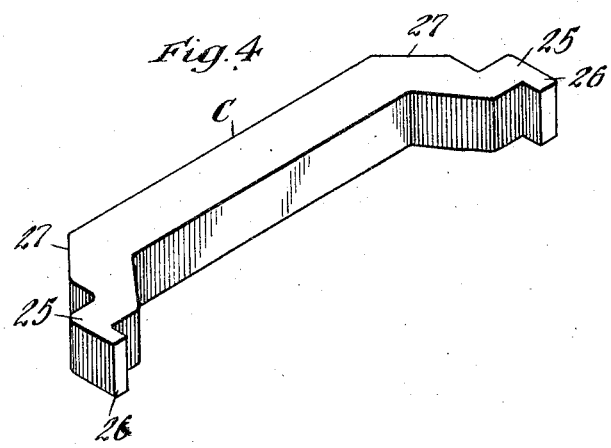
Witnesses
Wm. Geiger
Inventor
John F. O'Connor
By George J. Haight
His Atty.

Patented Jan. 4, 1927.

1,613,591

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed December 17, 1923, Serial No. 681,048. Renewed May 17, 1926.

This invention relates to improvements in friction shock absorbing mechanisms.

One object of the invention is to provide a friction shock absorbing mechanism especially adapted for railway draft riggings wherein high capacity is obtained by a system of tandem arranged springs and friction elements.

Another object of the invention is to provide a tandem arrangement of spring friction mechanism, such that the space usually required for the intermediate stops and yoke thimble of the well-known type of tandem spring gear is effectively utilized for accommodating friction elements to create additional capacity.

Other objects and advantages of the invention will more clearly appear from the description and claims hereinafter following.

In the drawings forming a part of this specification, Figure 1 is a horizontal, sectional view of a portion of a railway draft rigging, showing my improvements in connection therewith. Figure 2 is a vertical, sectional view corresponding substantially to the line 2—2 of Figure 1. And Figures 3 and 4 are detailed, perspective views respectively of one of the friction shoes and one of the wedge bars used in connection with my improved shock absorbing mechanism.

In said drawings, 10—10 indicate channel draft or center sills of a railway car, to the inner faces of which are secured front stop lugs 11—11, and rear stop lugs 12—12. A portion of the drawbar is indicated at 13, to which is attached a hooded yoke 14 within which the shock absorbing mechanism proper is disposed. The yoke and the movable parts of the draft rigging therewithin are supported by a detachable saddle plate 15.

The shock absorbing mechanism proper, comprises broadly, front and rear follower shells or casings A—A; two pairs of friction shoes B—B; two sets of wedge bars C—C; two spring followers D—D; a set of tandem arranged springs E—E; and a retainer bolt F.

The front and rear follower casings or shells A—A are of hollow rectangular form, each having horizontal top and bottom walls 16—16, vertical side walls 17—17 and a transverse end wall 18, the latter functioning as a follower in conjunction with the corresponding stop lugs. At the open end each shell is provided with interior opposed parallel friction surfaces 20 on the side walls thereof with which the friction shoes are adapted to coact. Each of the opposite side walls 17 of each shell has the outer edge thereof cut away between the top and bottom walls as indicated at 21, providing a shouldered seat having vertically disposed offset abutment faces.

The friction shoes B are four in number, a pair cooperating with the friction surfaces of each shell. Each shoe is in the form of a flat, rectangular plate having a vertically disposed side friction surface 120 adapted to coact with one of the friction surfaces of the shell. Each shoe is also provided with a plurality of longitudinally extending, equally spaced arms 22 arranged in parallel relation and each having a lateral enlargement 23 on the inner side thereof formed with a wedge face 24. As shown in the drawing, each shoe is preferably provided with three arms 23, the spaces between the arms being of substantially the same height as the arms. The shoes disposed within the rear follower shell A each have the upper arms thereof disposed in alinement with the upper edges of the shoes, the lower arm of each shoe being spaced from the bottom edge of the shoe a distance substantially equal to the height of the arm and the third arm being disposed midway between the top and bottom arms. The shoes within the front follower shell A each have the lower edges of the lower arms disposed in alinement with the lower edges of the shoes, the upper arm of each shoe being spaced from the upper edge thereof a distance substantially equal to the height of the arm, and the third arm being disposed midway between the top and bottom arms. The arms of the shoes associated with the front and rear followers respectively are thus arranged in staggered relation.

The wedge bars C are in the form of relatively heavy plates, comprising an elongated central section and offset end sections 25, each provided with a flange 26. In the instance shown, three bars C are associated with each shell, the same being horizontally disposed and spanning the space between the side walls of the shell. The lowermost bar of the set associated with the front follower shell is disposed in the spaces between the lowermost arms 22 and the bottom edges of the shoes, and the upper bar of the set associated with the rear follower shell is disposed in the spaces between the uppermost arms 22 and the upper edges of the shoes. The remaining arms are disposed in the spaces between the arms 22 of the respective pairs of shoes. It will be evident that the arms on the shoes hold the bars in spaced relation with the bars of the front follower arranged in staggered relation with reference to the bars associated with the rear follower, so that one set will pass between the other when the followers are moved toward each other. The offset ends of each bar C are seated in the seats 21 on the opposite side walls of the corresponding shell with the flanges 26 overhanging the offset portions of the seats, thereby preventing lateral displacement of the bars relatively to the shell, and any relative outward spreading of the walls 17 when subjected to pressure through shoes B—B. The central section of each bar has a pair of outwardly converging wedge faces 27 at the outer side thereof, the wedge faces being disposed at opposite sides of the central section, each coacting with one of the faces 24 of the corresponding shoe.

The two spring followers D, which are of like construction, are disposed respectively within the front and rear shells. Each spring follower is in the form of a rectangular plate engaging behind the projections 22 of the pair of shoes B associated with the corresponding shell.

The spring resistance element E—E are arranged in tandem relation, one being disposed in each shell. Each element E comprises a pair of springs consisting of an inner and an outer coil interposed between the rear wall 18 of the shells, and the spring followers D.

The mechanism is held in assembled relation and under initial compression by a retainer bolt F, having its opposite ends anchored in the hollow bosses 28 of the front and rear shells and extending through the coils of the front and rear springs and alined openings in the spring followers D, and the central pair of wedge bars C.

The operation of my improved shock absorbing mechanism is as follows, assuming a buffing movement of the front follower casing A, the front shell A will be moved rearwardly toward the rear shell, carrying the bars C connected thereto rearwardly in unison therewith, setting up a wedging action between the wedge faces of the bars and the shoes B associated with the rear shell, compressing the spring resistance therewithin. At the same time, the spring within the front shell will be compressed between the front wall 18 of the follower A and the spring follower D, forcing the shoes against the bars C associated with the rear follower, effecting a spreading action of the shoes and forcing the same into engagement with the friction surfaces of the shell. During the continued movement of the front follower, the same will slide on the friction shoes B therewithin and the shoes B associated with the rear follower will slip on the faces 20 thereof. The described action will continue until the top and bottom walls of the front and rear shells come into abutment, whereupon the forces will be transmitted directly through the shells to the rear stop lugs, thereby preventing the springs from being driven solid. The parts are so proportioned that the outer faces of the offset portions of the respective bars C will come into engagement with the outermost abutment surfaces of the offset seats of the respective shells when the top and bottom walls of the shells come into engagement.

During draft, the action is the reverse of that just described, the rear follower being moved toward the front follower, which is held stationary by the front stop lugs.

As wear occurs on the various friction surfaces and wedge faces, compensation therefor will be had due to the expansive action of the springs E, which, as hereinbefore pointed out, are under initial compression.

From the preceding description taken in connection with the drawings, it will be seen that my improved mechanism, considering it from a somewhat different angle than that followed in the preceding description may be considered as constituting two separate friction shock absorbing mechanisms arranged oppositely and each of which comprises a friction shell, spring resistance, friction shoes cooperable with the shell, and wedge pressure transmitting means, the wedge pressure transmitting means of one mechanism, being staggered or alternated and thereby overlapped with respect to the wedge pressure transmitting means of the other mechanism. With my duplicated friction mechanisms arranged as just outlined, it will be observed that I assure positive and simultaneous action of both mechanisms regardless of whether or not the resistances of each mechanism are the same.

I have herein shown and described what I now consider the preferred manner of carrying out my invention but the same is merely illustrative and I contemplate all changes and modifications that come within the scope of the claims appended hereto.

I claim:

1. In a friction shock absorbing mechanism, the combination with a pair of relatively movable followers; of tandem arranged springs coacting with said followers; and a friction wedge system interposed between said springs and coacting with said followers, said wedge system including wedge means movable in unison with the respective followers and friction shoes coacting with each follower.

2. In a friction shock absorbing mechanism, the combination with a pair of relatively movable follower shells; of tandem arranged springs coacting with said follower shells; a friction element coacting with each shell, said elements being interposed between said tandem arranged springs; and wedge means on said shells coacting with said elements.

3. In a friction shock absorbing mechanism, the combination with relatively movable front and rear follower shells having interior friction surfaces; of tandem arranged springs coacting with said follower shells; a friction wedge system coacting with each shell, said system including a plurality of wedge members movable in unison with each shell and friction wedge shoes coacting with said members, said shoes being interposed between said springs and coacting with the friction surfaces of the shells.

4. In a friction shock absorbing mechanism, the combination with a pair of relatively movable follower shells having longitudinally disposed friction surfaces thereon; of tandem arranged springs within said shells; friction shoes coacting with the friction surfaces of said shells and having their movement resisted by said springs; and wedge means at the adjacent ends of said shells and movable in unison therewith and coacting with the friction shoes.

5. In a friction shock absorbing mechanism, the combination with a pair of relatively movable friction shells, each having wedge means thereon; of a pair of friction shoes within each shell coacting with the wedge means of the other shell; and a spring resistance element within each shell coacting with the corresponding friction shoes.

6. In a friction shock absorbing mechanism, the combination with front and rear friction shells, each having wedge means thereon and interior friction surfaces; of a spring resistance within each shell; a pair of friction shoes coacting with the friction surfaces of each shell, said shoes being engaged by the wedge means of the other shell; and spring followers interposed between each spring and pair of shoes.

7. In a friction shock absorbing mechanism, the combination with front and rear follower shells, each open at one end; of a plurality of bars spanning the open end of each shell, said bars each having wedge faces thereon; friction shoes within each shell, said shoes having wedge faces coacting with the bars of the other shell; and yielding means within each shell opposing inward movement of the shoes.

8. In a friction shock absorbing mechanism, the combination with front and rear follower shells having interior friction surfaces; a spring resistance element within each shell; a pair of friction shoes within each shell coacting with the friction surfaces thereof, each shoe having a plurality of spaced arms, said arms being each provided with a wedge face; and a plurality of bars carried by each shell, said bars being alternated with the arms of the shoes of the corresponding shell, and having wedge faces thereon coacting with the wedge faces of the shoes within the other shell.

9. In a device of the character described, two friction shock absorbing mechanisms, each mechanism comprising: a friction shell; friction shoes cooperable with the shell; a spring resistance; and wedge pressure transmitting means cooperable with the shoes, the wedge pressure transmitting means of one mechanism being slidable with respect to wedge pressure transmitting means of the other mechanism and the friction shell of one mechanism actuating the wedge pressure transmitting means of the other mechanism.

In witness that I claim the foregoing I have hereunto subscribed my name this 12th day of December, 1923.

JOHN F. O'CONNOR.